United States Patent [19]

Sheth

[11] Patent Number: 5,464,687
[45] Date of Patent: Nov. 7, 1995

[54] WETTABLE POLYOLEFIN FIBER COMPOSITIONS AND METHOD

[75] Inventor: Paresh J. Sheth, Sugarland, Tex.

[73] Assignee: Lyondell Petrochemical Company, Houston, Tex.

[21] Appl. No.: 273,726

[22] Filed: Jul. 12, 1994

Related U.S. Application Data

[63] Continuation-in-part of Ser. No. 154,682, Nov. 18, 1993, which is a continuation-in-part of Ser. No. 987,010, Dec. 7, 1992, abandoned.

[51] Int. Cl.$^6$ .............................. C08K 5/06; C08L 23/12
[52] U.S. Cl. .................. 428/286; 428/288; 524/220; 524/243; 524/265; 524/317; 524/339; 524/376; 524/377; 524/378; 524/523; 525/194; 525/277
[58] Field of Search ...................... 428/286, 288; 525/194, 227; 524/243, 265, 317, 241, 376, 377, 378, 523, 220, 339

[56] References Cited

U.S. PATENT DOCUMENTS

| | | |
|---|---|---|
| 3,373,222 | 3/1968 | Armstrong . |
| 3,373,223 | 3/1968 | Armstrong . |
| 3,509,009 | 4/1970 | Hartmann . |
| 4,098,757 | 7/1978 | Gordon .................................. 264/211 |
| 4,110,143 | 8/1978 | Cogliano ................................ 156/167 |
| 4,154,647 | 5/1979 | Rave ...................................... 162/146 |
| 4,234,656 | 11/1980 | Amembal ............................... 525/227 |
| 4,304,234 | 12/1981 | Hartmann ............................... 264/75 |
| 4,372,310 | 2/1983 | Sergeant ................................ 128/284 |
| 4,372,312 | 2/1983 | Fendler et al. ....................... 128/290 R |
| 4,540,414 | 9/1985 | Wishman ............................... 604/378 |
| 4,550,725 | 11/1985 | Wishman ............................... 128/155 |
| 4,636,436 | 1/1987 | Clementini ............................. 525/380 |
| 4,734,445 | 3/1988 | Noda et al. ............................ 523/201 |
| 4,782,110 | 11/1988 | Wolfe, Jr. ............................... 524/522 |
| 4,804,378 | 2/1989 | Shiba et al. ............................ 604/367 |
| 4,853,290 | 8/1989 | Yanidis .................................. 428/516 |
| 4,868,031 | 9/1989 | Modrak et al. ......................... 428/198 |
| 4,892,532 | 1/1990 | Boman ................................... 604/366 |
| 4,892,534 | 1/1990 | Datta et al. ............................. 604/370 |
| 5,033,172 | 7/1991 | Harrington ............................. 156/283 |

FOREIGN PATENT DOCUMENTS

| | | | |
|---|---|---|---|
| 783 | 2/1979 | European Pat. Off. ............... | 525/227 |
| 0192965 | 3/1986 | European Pat. Off. . | |
| 0307116 | 3/1989 | European Pat. Off. . | |
| 2733470 | 2/1979 | Germany ............................... | 525/227 |
| 202141 | 10/1985 | Japan .................................... | 524/377 |

OTHER PUBLICATIONS

Guide to Nonwoven Fabrics published by INDA, association of the nonwoven fabrics industry.

*Primary Examiner*—David Buttner
*Attorney, Agent, or Firm*—Browning, Bushman, Anderson & Brookhart

[57] ABSTRACT

Compositions of ethylene alkyl acrylate grafted onto a polyolefin such as isotactic polypropylene are provided. The composition is highly wettable by adding both a polar group material and a hydrophilic modifier to the polypropylene. The process comprises extruding the polyolefin into a fiber which is spinnable and may be used to form woven or nonwoven materials. The composition products are particularly well suited for forming various goods, including diaper coverstock, personal hygiene pads, battery separators, filters, tea bag pouches and filter stock.

34 Claims, 1 Drawing Sheet

WETTABLE POLYOLEFIN FIBER COMPOSITIONS AND METHOD

This is a continuation in part of Ser. No. 08/154,682 filed Nov. 18, 1993 which is a continuation in part of Ser. No. 08/987,010 filed Dec. 7, 1992 now abandoned.

FIELD OF THE INVENTION

The present invention relates to a formulation and method for imparting both wetting and spreading characteristics to polyolefin containing fibers and nonwoven materials. More particularly, the invention is directed to a fiber composition comprising polypropylene, an ethylene compolymer including ethylene and an alkyl acrylate wherein the alkyl has from one to four carbon atoms, and a hydrophilic modifier.

BACKGROUND OF THE INVENTION

The manufacture and various uses of polyolefin-based fibers and corresponding nonwoven materials are well known in the textile art. Attempts to apply such knowledge to produce products in the area of personal hygiene, such as cover stocks for catamenial devices, disposable diapers, and incontinence pads, have met with limited success. Such products must have a fluid-absorbent core, usually comprising one or more layers of fluid absorbent material such as wood pulp, gauze, or tissue and, in some cases, synthetic hydrophilic material, such as hydrophilic polyurethane foam.

The fluid-absorbing material is typically provided in the form of a thermally bonded pad. To protect the clothing or areas around the user from being stained or wetted by fluids absorbed by the pad, the pad may be backed by a fluid impervious barrier sheet. The absorbent product is typically positioned against the body with the hydrophilic material facing and contacting the body and the fluid impervious barrier layer facing the outside. To enhance a sense of comfort, such absorbent products also generally employ a facing or cover stock material which covers the body-facing surface of the product. The facing or cover stock must be very pervious to fluids on the side of the product that is placed against the body, and yet be essentially nonabsorbent. Such material should also feel smooth and soft to the touch. In addition, certain additional characteristics are also sometimes desired, such as visual opacity, specific coloring, and luster on the outer surfaces.

In order to obtain many of above-listed characteristics, a cover stock utilizing essentially hydrophobic polymeric material, such as polyolefin fiber or film, may be made at least temporarily hydrophilic yet have the continuing ability to pass aqueous fluids through. This is particularly important in the case of diaper cover stock so as to avoid lateral liquid migration and side leakage without interfering with fabric bonding steps or wet strength of the final product.

Based on the teaching in the paper-making art, it is known that short term hydrophilicity can be imparted to hydrophobic polymers such as polyolefin fiber by using flash evaporation techniques and treating the resulting fiber or filament with hydrophilizing agents such as polyvinyl alcohol or various nitrogen-containing water-soluble polymers. U.S. Pat. Nos. 4,156,628, 4,035,229, 4,082,730, 4,154,647, 4,156,628, 4,273,892 and 4,578,414 are indicative of this teaching. Efforts to incorporate an alkoxylated alkylphenols or corresponding polyoxyalkylenes into spun melt fiber compositions is disclosed in U.S. Pat. No. 4,578,414.

U.S. Pat. No. 5,033,172 discloses that the hydrophilicity and liquid strike through properties of fiber (both continuous and staple), fibrillated film and corresponding nonwoven materials can be obtained and retained for an extended period by incorporating into the corresponding polyolefin-containing cast or spin melt composition, and an effective amount of a modifier composition. The modifier composition may compromise (a) at least one N,N-polyalkoxylated 10–22 carbon fatty acid amine, inclusive of amines having 12–20 carbon and preferably 18 carbon linear straight chain moiety such as octadecyl amine or octadecenyl amine; and (b) up to about 60%, and preferably 0–45% by weight of modifier composition, of a primary or secondary 10–22 carbon fatty acid amide such as stearamide. After spinning or casting the resulting melt to obtain fiber or film, then processing the fiber or film in accordance with the techniques disclosed in U.S. Pat. Nos. 4,310,594 and 3,576,931, the corresponding webs can be oriented and bonded by conventional means to obtain the desired non-woven material. Such treated fiber can, if desired, be a continuous or staple bicomponent fiber such as a sheath/core variety in which the polyolefin sheath spun melt contains the modifier composition of the homogeneous (e.g. monoolefin) type.

In U.S. Pat. No. 4,853,290, issued to Apostol Yanidis on Aug. 1, 1989, a blend of ethylene-acrylic acid copolymer and ethylene-methylacrylate copolymer is coextruded onto a polypropylene film to serve as an adhesive or tie layer to a second polymer applied to it.

In U.S. Pat. No. 4,782,110, issued to James R. Wolfe, Jr. on Nov. 1, 1988, melt processible multi-phase thermoplastic compositions are described which can be formed into various shapes by compression molding, injection molding, blow molding and extrusion, and said to be useful for automotive parts, e.g. automotive boots, seals, gaskets, tubing, reinforced hose, film and sheeting. The composition comprises a blend of (a) 15–75 parts by weight of a crystalline polyolefin resin forming the continuous phase of the composition, and (b) 25–85 parts by weight of a crosslinked elastomer of an ethylene alkyl acrylate copolymer consisting essentially of units derived from ethylene, an alkyl ester of acrylic acid wherein the alkyl group contains 1–6 carbon atoms, and a monoalkyl ester of 1,4-butenedioic acid wherein the alkyl group contains 1–6 carbon atoms, forming the discontinuous phase of the composition.

U.S. Pat. Nos. 3,373,222 and 3,373,223 each issued on Mar. 12, 1968 to Robert G. Armstrong disclose polymeric blends comprising polyolefin resin, polyamide resin, and either a carboxylated polyethylene, an ethylene-acrylic or a methacrylic acid copolymer. Homogeneous polymeric blends have utility in the preparation of films useful in the packaging industry, and in the preparation of plastic bottles and other containers which require a high degree of impermeability.

U.S. Pat. No. 5,033,172 discloses a hydrophobic polyolefin containing nonwoven material which may contain up to 60% by weight a particular modifier composition. U.S. Pat. Nos. 4,540,414 and 4,550,725 disclose a nonwoven polypropylene fabric designed for removal of moisture from the skin of human beings covered by the fabric. U.S. Pat. No. 4,892,532 discloses a particular arrangement of liquid absorbing fabrics and fabric layers suitable for forming a diaper material. U.S. Pat. No. 4,804,378 discloses a material suitable for forming a sheet having a hydrophilic surface and a hydrophobic inside.

U.S. Pat. No. 4,304,234 discloses bonded polyolefin filaments for forming nonwoven fabrics, and a process for spinning nonwoven fabrics. U.S. Pat. No. 3,509,009 provides an early teaching of nonwoven fabrics. U.S. Pat. No. 4,734,445 discloses a latex composition suitable for applications requiting surface hydrophilicity, including various nonwoven fabrics and paper products. U.S. Pat. No. 4,372,310 discloses woven panels for diapers, and U.S. Pat. No. 4,892,534 discloses nonwoven webbed materials for diapers, incontinent products, and feminine care napkins. U.S. Pat. No. 4,372,312 discloses a nonwoven hydrophilic web suitable for a pad material, and U.S. Pat. No. 4,868,031 discloses various polyolefin fiber-containing nonwoven materials. European Patent Publication Nos. 0307116 and 0192965 disclose both porous films and absorbent layers for various sanitary articles.

SUMMARY OF THE INVENTION

A novel polyolefin fiber comprises about 98 to 70% by weight of a polyolefin and a selected amount of a polar group material, such as an ethylene copolymer or an acrylic acid or maleic anhydride, incorporated into the polypropylene to form an alloy, and a hydrophilic modifier. The ethylene copolymer may comprise about 70 to 82% by weight ethylene and about 30 to 18% by weight of an alkyl acrylate relative to the sum of the polypropylene and ethylene copolymer, wherein the alkyl has one to four carbon atoms, said alkyl acrylate present in an amount 0.2 to 3.0% by weight. The hydrophilic modifier is present in an amount of less than 2% by weight, and preferably between 0.1% and 2.0% by weight, the sum of the polypropylene and ethylene copolymer.

A novel process for forming fibers based on polypropylene comprises combining isotactic polypropylene with a polar group material and a hydrophilic modifier. The polar group material may be ethylene copolymer of about 70 to 82% by weight ethylene and about 30 to 18% by weight of an ethylene alkyl acrylate wherein the alkyl group has one to four carbon atoms. Alternatively, the polar group material may be an acrylic acid or maleic anhydride. The hydrophilic modifier may be present in an amount between 0.1% and 2.0% by weight, and preferably between 0.4% and 1.0% by weight, the sum of the polypropylene and ethylene copolymer. The composition may be extruded into a fiber which are commercially spinnable.

The polyolefin in these compositions and processes preferably is isotactic polypropylene. In the processes, the composition may be a blend or one in which at least a portion of the ethylene copolymer is grafted onto said polyolefin. The ethylene copolymer in the compositions include ethylene methyl acrylate, ethylene ethyl acrylate, and ethylene butyl acrylate.

It is an object of the present invention to provide an improved inert hydrophobic polyolefin-containing nonwoven composition with desired wettability characteristics.

It is a further object of the present invention to provide an improved polyolefin-containing web comprised of fibers, or a nonwoven or fibrillated film suitable as cover stock for various sanitary products.

Still another object is to obtain and retain high hydrophilicity and liquid strike-through properties in a strong well-bonded nonwoven hydrophobic material, including continuous and/or staple fibers utilizing polyolefin components.

It is a significant feature of this invention that the polypropylene-based material may be used to form fibers having applications for either woven materials or nonwoven materials, and that the fibers are spinnable at commercially acceptable rates.

Yet another feature of the invention is that a polypropylene-based material may be efficiently modified to form a material having a wettability contact angle of less than about 80°.

An advantage of the invention is that the wettable polyolefin material according to this invention is more easily dyeable than prior art polyolefin fiber materials.

DETAILED DESCRIPTION OF THE INVENTION

Figure 1:
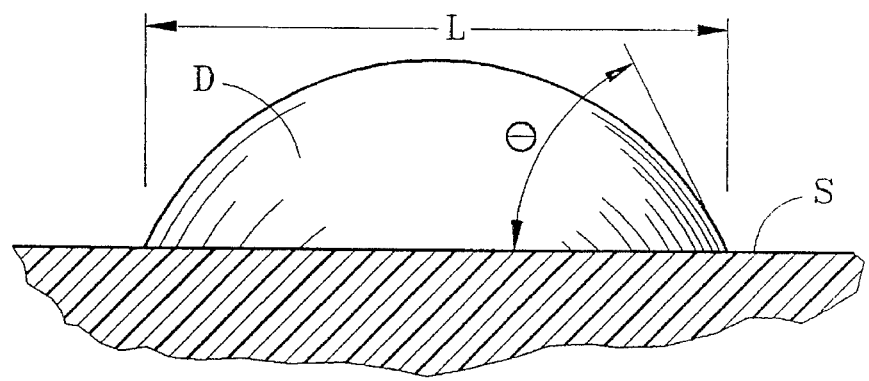
FIG. 1 is a schematic representation of a liquid drop at an equilibrium state on a solid surface.

Polyolefins useable in accordance with this process are crystalline polyethylene, polypropylene, or copolymers thereof, having melt indices in the range from about 0.1 to about 80 g/10 min. The most important polyolefin for use in formation of fibers at this time is isotactic polypropylene, which is rendered dyeable by the process of the present invention, and is commercially available from many sources. The polypropylene can contain the usual thermal, oxidative and ultraviolet light stabilizers.

The fiber forming composition may comprise polypropylene and a copolymer of ethylene and an alkyl acrylate having 2 to 30% by weight, suitably 2 to 15%, preferably 4 to 10%, most preferably about 7%. Alternatively, and in accordance with this invention, the copolymer of ethylene and an alkyl acrylate is grafted onto the polypropylene, and the composition may include both grafted and blended ethylene alkyl acrylate copolymer. An advantage of the ethylene alkyl acrylate copolymer is that it is both thermoplastic and compatible with polypropylene so that processing difficulties are minimized or prevented. By the term compatible is meant that the copolymer does not separate into discrete particles in the polypropylene composition which are observable under an optical microscope at a magnification of times 250 to 500.

The ethylene copolymer comprising ethylene and an alkyl acrylate in the compositions used in this invention include ethylene methyl acrylate, ethylene ethyl acrylate, and ethylene butyl acrylate. Ethylene methyl acrylate copolymer ("EMA") alone or in blends has been used in film, extrusion coating, sheet, molding, tubing, profile extrusion and coextrusion areas. Compared to low density polyethylene homopolymer, it has a lower softening temperature (138° F.), a reduced flexural modulus, and improved environmental stress crack resistance. It is thermally stable and can be processed at extrusion coating temperatures of 600° F. to 630° F. It is said to have been used as a blending component with low density polyethylene, polypropylene, polyester, and polycarbonate to improve impact strength and toughness, to increase heat seal response and promote adhesion, to reduce stiffness, and to increase the surface coefficient of friction. *Modem Plastics*, Mid-October Encyclopedia Issue, 1991, pp. 71–72.

Ethylene ethyl acrylate copolymer ("EEA") resins are tough, flexible copolymers that have found application in profile extrusion specialty hose and tubing applications, gasketing, and bumpers; film applications include disposable examination gloves for doctors and dentists, balloons, etc. EEA has been used for hot melt adhesives. As the ethylacrylate content of EEA increases, the copolymers become more flexible, tougher, and more resilient. The polarity of high ethylacrylate resins is said to enhance surface acceptance of inks and provide adhesive properties. *Modern Plastics*, Mid-October Encyclopedia Issue, 1991, pp. 71–72.

Ethylene butyl acrylate ("EBA") is used for low melt-index films. It produces a tough film at low temperatures and is employed mainly in the packaging of frozen foods. *Modern Plastics*, Mid-October Encyclopedia Issue, 1991, p. 68.

Particularly preferred copolymers are the ethylene methyl acrylate random copolymers of ethylene and methylacrylate and the ethylene ethyl acrylate random copolymers of ethylene and ethylacrylate. The EMA copolymers preferably contain about 20 to 24 % and preferably about 20% by weight of methylacrylate. The EEA copolymers preferably contain about 15 to 30% by weight of the ethylacrylate moiety. These copolymers have a melt index of 1 to 20, preferably about 18; and have a thermal stability such that when the temperature is raised at 10° C./min., under flowing nitrogen, less than 0.75% of the copolymer weight is lost at 300° C.

It is a critical feature of the present invention that the amount of alkyl acrylate in the polypropylene ethylene alkyl acrylate copolymer be present in an amount between 0.2% to 3.0% by weight, and preferably between 0.5% and 2.0% by weight, in order to produce a textile fiber having commercially acceptable processing characteristics. If the amount of alkyl acrylate component is increased above 3.0%, a textile fiber produced therefrom loses its necessary polypropylene characteristics, degrades during high-speed fiber processing and produces a final fiber with unacceptably low tenacity (less than about 1.5 grams/denier) and excessive elongation and with significantly different melt characteristics to be commercially unacceptable. For example, carpet made from fibers having an alkyl acrylate component between 3.0% and 5.0%, melts excessively upon exposure to flame as compared to conventional polypropylene carpet to the point that it dramatically fails a standard "pill test" for flame resistance while standard polypropylene passes. Further at an alkyl acrylate content above 2.0% the fiber fuses together on the heated drawing rolls and is basically unspinnable on modern commercial scale equipment. These subtle, yet commercially critical, limitations were completely unexpected.

An alkyl acrylate component of less than 0.2% produces a fiber with insufficient polarity performance character to inpart a desired wettability feature. Accordingly, the maximum amount of alkyl acrylate component is preferred subject to acceptable fiber production and performance character. The more preferred alkyl acrylate component is between 0.5% to 1.7% by weight, with 1.0 to 1.5% being most preferred.

It is understood that polymer additives, such as thermal, oxidative and ultraviolet light stabilizers, which are typically found in fiber-forming polymer compositions may be added without departing from the present invention. The percent by weight values given in this application are expressed as a percent by weight of the sum of the polypropylene and alkyl acrylate copolymer. Accordingly, if nylon and/or a filler material were added to the polypropylene/alkyl acrylate copolymer mixture, the ratio of the polypropylene and alkyl acrylate copolymer would not be affected since the "base" mixture has not changed. Such additives are commonly included in a polypropylene/copolymer composition to dilute the polymer composition. If such additives are included in the composition to dilute the polymer composition, the percent values must be adjusted accordingly.

As discussed, the ethylene copolymers utilized in the present invention contain at least 70% ethylene with the alkyl acrylate component present between 2 to 30%, typically between 18 to 24% depending upon the selected alkyl acrylate. Depending upon the amount of alkyl acrylate component present in the ethylene copolymer, the ratio of ethylene copolymer to polypropylene can be easily adjusted to maintain the proper amount of alkyl acrylate in the final product. It is also important that the amount of ethylene contributed by the ethylene copolymer be maintained below 10%. Accordingly, it is preferred that the higher the percentage of alkyl acrylate in the copolymer, the easier it is to obtain the proper balance of components. By way of example, a mixture of 93% polypropylene and 7% ethylene methyl acrylate having a 20% methyl acrylate component produces a polypropylene/ethylene methyl acrylate copolymer composition having a methyl acrylate component of about 1.4%. Similarly, a 3% addition of the same ethylene methyl acrylate copolymer produces a methyl acrylate component of 0.6%.

It has been found very desirable in some applications to blend a polyamide, such as nylon 6 or nylon 6,6, into a first composition (a polypropylene and ethylene copolymer composition) to further enhance the first composition without sacrificing the desired spinning or dyeing properties of the fiber. The addition of polyamide forms a second composition (e.g., a polypropylene/copolymer/nylon 6 composition) with improved flammability, improved tenacity and improved resiliency compared to the first composition, even to a point that the modified fiber is more resilient than polypropylene alone. The added polyamide is by weight about 1 to 20%, and preferably 5 to 15%, the weight of the first composition. When a nylon component is added it may substitute for a part of the ethylene copolymer as long as the alkyl acrylate component doesn't drop below an amount sufficient to keep the otherwise immiscible polypropylene and polyamide from separating (usually about 0.5%). A preferred composition when polyamide is included is about 1.4% alkyl acrylate component (approximately 7% ethylene copolymer) and 15% nylon 6 with the remainder (approximately 93%) polypropylene. For this one preferred composition, the alternatively expressed phr valves are 100 phr polypropylene, 7.5 phr ethylene copolymer, and 20 phr nylon.

In using a composition of the polypropylene and ethylene-alkylacrylate copolymer in carrying out the dyeing procedure of this invention, it is important that the polypropylene and ethylene-alkylacrylate copolymer be uniformly incorporated prior to forming the composition into a shaped article. The combination may be only a uniform blend, but preferably, and in accordance with this invention, it is a composition in which at least a portion of the ethylene alkyl acrylate is grafted onto the polypropylene. Whether by blending and/or grafting can be accomplished in a separate step prior to forming, or the blending and/or grafting and extrusion can be carried out in the same operation if the extruder has a suitable mixing section. Poor blending and/or grafting can result in uneven dyeing even if the remaining steps of dyeing procedure are properly conducted.

The grafting of ethylene alkyl acrylate copolymer to polyolefin polymer, preferably isotactic polypropylene, for use in this invention is accomplished by subjecting the ethylene alkyl acrylate copolymer to co-graft polymerization in the presence of the polyolefin polymer. The graft polymerization method is not critical and the graft polymerization can be effected according to conventional methods employing organic free radical initiators. The polymerization conditions may be those known to the art. The organic radical-generating agent used in this invention includes:

2,5-dimethyl-2,5-di(t-butylperoxy)hexyne-3, 2,5-dimethyl-2,5-di(t-butylperoxy)hexane, 1,3-bis(t-butylperoxyisopropyl)benzene, 2,2-bis(t-butylperoxy)-p-diisopropylbenzene, dicumyl peroxide, di-t-butyl peroxide,t-butyl benzoate, 1,1-bis(t-butylperoxy)-3,3,5-trimethylcyclohexane, 2,4-dichlorobenzoyl peroxide, benzoyl peroxide, azobisisobutyronitrile and the like.

Preferred are:

2,5-dimethyl-2,5-di(t-butylperoxy)hexane, 1,3-bis(t-butylperoxyisopropyl)benzene and 2,2-bis-(t-Butylperoxy)-p-diisopropylbenzene.

The thermoplastic resin composition of this invention can be obtained by adding 0.01–0.3 parts by weight, preferably 0.05–0.2 parts by weight, of an organic radical-generating agent to 100 parts by weight of a mixture consisting of 98–70% by weight, preferably 96–90% by weight of polypropylene, and 2–30% by weight, and preferably 4–10% by weight, of an ethylene alkyl acrylate copolymer, and then subjecting the resulting mixture to thermal treatment in a mixer (e.g., a Banbury mixer, a kneader) or an extruder at 170° to 300° C., preferably 180° to 250° C., for 0.2 to 30 minutes, preferably 0.5 to 20 minutes.

The uniform combination of polypropylene and ethylene-alkyl acrylate copolymer is formed into the desired shaped article by any of the known techniques such as melt spinning in the case of fibers; casting or other known methods of film-making, extrusion or injection molding. The present invention is particularly useful with fibers and fibers of various deniers can be adequately wetted both in the form of fibers or non-woven webs made from these fibers. This invention is also useful for dyed fibers. When a degree of orientation is increased, at a given melt flow rate, for example, by a times 3 compared to a times 1.5 draw ratio, a significant increase in uptake of the dyestuff is observed. An increased degree of orientation is the result of the degree of higher draw ratios. Generally, the fibers are from 1 to 1500 denier and can be in the form of round or lobed fibers, tape or fibrillated film. Round or lobed fibers are for apparel, upholstery and carpet face yarn uses and can have a denier of about 1 to 60 without encountering dyeing problems by the present technique. These fibers can also be used in production of other articles, such as decorated ribbons or nonwoven textiles. The tape fibers are generally used for carpet backing and are of heavier denier, i.e., about 500 to 1500 denier. Fibrillated film fibers are used for cordage carpet face yarn or upholstery.

Sizing is a procedure by which warp yarn is prepared for weaving by coating it with a sizing agent, such as PVA. In effect, sizing reduces the metal to fiber friction, thereby protecting the yarn from abrasion. It is important for the yarn to be sized so that it perform well on the weaving machines without being abraded and cause processing problems.

A Lawson Hemphill CTT-YAT (Constant Tension Transport-Yarn Abrasion Tester) single end tester was used to test the fibers described herein. The instrument abrades a yarn over a "standard" copper wire or some other wire in the same location until the wire breaks or is incised. The yardage of yarn that is passed before such a failure is indicative of the frictional properties of the yarn. In this experiment, however, a continuous but same loop of yarn was run against the wire, until such time as the yarn failed. The number of cycles to failure for the 2 meter length of looped yarn was used as a basis for assessing the frictional properties. The fiber as disclosed above withstood 207 cycles, whereas regular polypropylene fiber withstood 182 cycles, thereby illustrating that this modified polypropylene fiber was more readily sizable than regular polypropylene and therefore should better withstand tortuous weaving conditions.

Through use of the AATCC test method for shrinkage from home laundering, it was determined that this modified polypropylene fiber had similar shrinkage characteristics as regular polypropylene. A vertical flammability test commonly used in the textile industry was also performed on this modified polypropylene fiber. There was no significant difference between flammability test results for this fiber and for conventional polypropylene fibers.

For fibers to be fully penetrated by dye, the spinning and drawing processes should be conducted in a manner to produce a fiber with a uniform structure through its cross-section, i.e., minimal sheath/core structural differences. On the other hand, greater economy of dye use in dyeable carpet backing made from woven tapes can be obtained if such tapes do possess a sheath/core structure. In these sheath/core structures, the sheath is dyeable, while the core exhibits very little dye pick-up. Thus, less dye is used to dye a backing which is made up from such fibers.

After spinning of the fibers, but before drawing, a spin finish can be applied to the fibers. If such a material is used, it may be anionic, but preferably is non-ionic in nature. Non-ionic spin finishes are commercially available and a preferred one is "Dispersol VL". Suitably useable is "Nopcostat" 2152P, which is thought to be a modified coconut fatty acid ester. Finishes containing mineral oil act as a plasticizer and can increase dye uptake rate at the fiber surface. A water-dispersible or water-soluble finish such as the "Dispersol VL" is preferred.

Finishing operations can optionally be performed on the fibers before dyeing. For example, the fibers can be texturized by mechanically crimping or forming such as described in *Textile Fibers, Dyes, Finishes, and Processes: A Concise Guide*, by Howard L. Needles, Noyes Publications, 1986, p. 17–20.

The invention can be further understood by referring to the following examples in which parts and percentages are by weight unless otherwise indicated.

EXAMPLE 1

A polypropylene alloy composition containing 93% by weight of a commercial fiber grade of isotactic polypropylene having a melt flow rate of 18 (ASTM D-1238-89, 230° C., 2.16 lbs) and containing thermal, oxidative and ultraviolet light stabilizers and 7% by weight of a copolymer of ethylene methylacrylate along with an ethoxylated alkyl modifier (0.5% by weight) is prepared by first dry mixing the polymers and then melt blending the mix in a 40 mm Berstorff extruder at 246° C. The selected modifier was an anionic modifier Product No 5808 available from G. A. Goulston and Company in Monroe, N.C. This compound consists of an ethoxylated alkyl modifier with C-12 to C-18 chain length, along with minor components of antistat and surfactant, and will be referred to herein as 5808 Modifier. The ethylene copolymer contains 20% by weight of the methylacrylate comonomer, and has a melt index of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubularknit fabric. Samples of the fibers were tested for wetting characteristics.

EXAMPLE 2

A polypropylene graft composition containing 93% by weight of a commercial fiber grade of isotactic polypropylene having a melt flow rate of 4 (ASTM D-1238-89, 230° C., 2.16 lbs) and 7% by weight of a grafted copolymer of ethylene methylacrylate (and containing thermal, oxidative and ultraviolet light stabilizers) is prepared by first dry mixing the polymers along with 0.5% by weight of the 5808 Modifier, and then melt blending the mix in a 40 mm Berstorff extruder at 246° C. in the presence of sufficient free radical initiator peroxide, specifically, 2,5-dimethyl-2,5-di-(tertiary-butyl peroxy)hexane, to visbreak the composition to a product melt flow rate of 18. The ethylene copolymer contains 20% by weight of the methylacrylate comonomer, and has a melt index of 18 (ASTM D-1238-89, 190° C., 2.16 lbs). The resulting homogeneous, compatible polymer blend is cut into nibs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18–20 per filament. The physical properties of specimens of the fibers so prepared are tested, and the test results are set forth in Table I. Specimens of the fibers are knitted on a knitting machine to produce a tubular knit fabric. Samples of the fibers were tested for wetting characteristics.

TABLE I

| Physical Properties | (Unmodified homopolymer) | Example I (Alloy Modified PP) | Example II (Grafted Modified PP) |
| --- | --- | --- | --- |
| Denier (gms/9000 meters) | 1,450 | 1,480 | 1,460 |
| Tensile (gms/den) | 2.5 | 2.5 | 2.3 |
| Elongation (%) | 39.0 | 44.0 | 48.0 |
| Toughness (gms/den) | 0.69 | 0.75 | 0.80 |
| Energy at Break (gms - inch) | 3,980 | 4,420 | 4,675 |
| Young Modulus (gms/den) | 17.0 | 12.0 | 10.5 |

EXAMPLE 3

A polypropylene combination alloy and graft composition containing 93% by weight of a commercial fiber grade of isotactic polypropylene having a melt index in the range of 8–12 (ASTM D-1238-89, 230° C., 2.16 lbs) (and containing thermal, oxidative and ultraviolet light stabilizers) and 7% by weight of an alloyed and grafted copolymer of ethylene methylacrylate is prepared by first dry mixing the polymers along with a 5808 Modifier (0.5% by weight), and then melt blending the mix in a 40 mm Berstorff extruder at 246° C. in the presence of sufficient free radical initiator peroxide, specifically 2,5-dimethyl-2,5-di(tertiary-butyl peroxy)hexane, to visbreak the composition to a product melt flow rate of 18. The ethylene copolymer contains 20% by weight of the methylacrylate comonomer, and has a melt index of 18 (ASTM D-1238-89, 190° C., 2.16 lbs). The resulting homogeneous, compatible polymer blend is cut into ribs after water-quenching, which are then fed to a melt spinning apparatus and 50–60 denier per filament fiber is spun at 230°–245° C. A mineral-oil based finish containing anionic surfactants is applied to the fiber bundle after spinning, but before drawing. The fibers are drawn times three to give a final denier of 18– 20 per filament. The physical properties of specimens of the fibers so prepared are tested, and the test results are about the same as those obtained with the fibers of Example 2. Specimens of the fibers are knitted on a knitting machine to produce a tubular knit fabric. Samples of the fibers were tested for wetting characteristics.

The theoretical background of wetting phenomena may be understood by reference to FIG. 1. The typical example of the wetting process is a drop of liquid, D, wetting a solid surface, S. As shown in FIG. 1, the contact angle $\Theta$ is the angle between the liquid-vapor and liquid-solid interface measured in the liquid phase at the three-phase interface where liquid contacts the solid. This contact angle $\Theta$ on a smooth surface is related to the energies of the solid-liquid, $Y_{SL}$, solid-vapor $Y_{SV}$, and liquid-vapor $Y_{LV}$ interfaces by the Young - Dupre Equation as follows:

$$Y_{SV} - Y_{SL} = Y_{LV} \cos \Theta,$$

The same phenomena in slightly different terms may be expressed as follows:

$$Y_S = Y_{SL} + Y_L \cdot C_{os}\Theta$$

and $$W_{SL} = Y_L [1 + C_{os}\Theta].$$

The $Y_S$, $Y_L$ and $Y_{SL}$ are the free energies per square centimeter, e.g., dynes/cm of the solid, liquid and solid-liquid interfaces, i.e., their surface tensions. $W_{SL}$ is the work of adhesion, or the work required to separate the liquid from the solid. $\Theta$ is the contact angle formed at the solid - liquid interface.

The core of the physical phenomena expressed by the above equations may be described as follows. When the adhesion between solid and liquid is less than the self cohesion (or surface tension) of the liquid, there is a contact angle. The larger the angle, the smaller the adhesion. When the adhesion is equal to or greater than the cohesion, the angle is zero and a complete wetting occurs. The approach mentioned above simplistically describes only the conditions of pure thermodynamic equilibrium, and its application to dynamic processes may be questionable.

Using Young's Equation, it is possible to use the contact angle as the criteria for wetting. It is logical to assume that if $\Theta = 0°$, one has complete wetting; if $0 < \Theta < 90°$, one has partial wetting; if $\Theta > 90°$, one has non-wetting. Polyolefins generally have contact angles greater than 90°. As a practical matter, one does not have generally satisfactory wetting, at least with respect to the wetting of polyolefin materials, if the contact angle is not less than about 80°.

This invention specifically deals with the synergistic phenomena between polyolefin and ethylene methacrylate, acrylic acid and/or maleic anhydride in combination with a hydrophilic modifier, such as an ethoxylated alkyl structure, either in the form of non ionic or anionic or cationic.

Polyolefin type polymers are the most challenging fibers to wet using conventional fiber production techniques. Polypropylene practically is a non polar polyolefin polymer with a very low surface energy. It has been reported that the surface energy of polypropylene is a 28.7 dynes/cm with 26.0 and 2.7 dynes/cm dispersive and polar fractions, respectively.

Polypropylene can be modified with EMA at a certain level to enable the polyolefin fibers to be reliably dyed with dispersed dyes. However, the introduction of polar groups does not impart any "wettable" characteristics. Similarly, both acrylic acid and maleic anhydride modified products also do not yield a wettable polymer or fiber. Commercial materials, such as the Polybond™ material from BP Performance Polymers Inc., combine functional monomers such as acrylic acid or maleic anhydride with polyolefin, and thereby form chemically grafted polyolefin copolymers. This chemically grafted polyolefin copolymer, when combined with polypropylene, similarly does not produce a wettable fiber.

Hydrophilic modifiers, such as an ethoxylated alkyl structure, when incorporated into a polyolefins matrix, also do not offer any appreciable wettability. However, when the hydrophilic modifier is used in conjunction with polar substrates such as EMA or Polybond, the wettability of the polyolefin improves dramatically, as measured by contact angle. This wettability can be further improved if a polyamide (either nylon 6 or 66) at a level between 2–20% is also incorporated.

Another characteristic of a polyolefin material is its spreading factor, which may be defined as the ratio of the length L of a liquid drop D on a surface S as a function of time. Accordingly, $L_o$ may be the measured length of a drop D 30 seconds after being deposited on surface S, and $L_1$ may be the length of the same drop D on surface S 5 minutes after being deposited (4.5 minutes subsequent to the time $L_o$ is measured). In this case, the spreading factor SF may be expressed as follows:

$$SF = \frac{L_1 - L_0}{L_0}$$

The spreading factor was measured by the difference in drop length relative to that of the original drop length over 5 continuous minutes. Generally, if this spreading factor is <1.0, then the resultant composition and fiber/fabric is considered not wettable. An ideal wettable polymer therefore will have both contact angle <80° and a spreading factor >1.0.

TABLE II

WETTING OF SPREADING CHARACTERISTICS OF POLYOLEFIN BASED FILAMENTS

| Sample ID | Contact Angle After 30 Seconds | Contact Angle After 5 Minutes | Spreading Factor |
| --- | --- | --- | --- |
| Polypropylene (pp) | 105 | 100 | <<<1 |
| pp + non-Ionic modifier | 98 | 90 | <<1 |

TABLE II-continued

WETTING OF SPREADING CHARACTERISTICS OF POLYOLEFIN BASED FILAMENTS

| Sample ID | Contact Angle After 30 Seconds | Contact Angle After 5 Minutes | Spreading Factor |
| --- | --- | --- | --- |
| pp + anionic modifier | 96 | 90 | <<1 |
| pp + Ethylene Copolymer | 98 | 90 | <<1 |
| pp + Ethylene Copolymer + non-ionic modifier (0.5%) | 65 | 52 | <1 |
| pp + Ethylene Copolymer + non-ionic modifier (1%) | 45 | 38 | −1.0 |
| pp + Ethylene Copolymer + anionic modifier (0.5%) | 59 | 51 | >1 |
| pp + Ethylene Copolymer + anionic modifier (1.0%) | 62 | 51 | >1 |
| pp + Ethylene Copolymer + nylon 6(6%) + anionic modifier (0.5%) | 47 | 31 | >1 |
| pp + Ethylene Copolymer + nylon 6(6%) + anionic modifier (1.0%) | 50 | 31 | >1 |
| pp + Ethylene Copolymer + nylon 6(10%) + anionic modifier (1.0%) | 26 | 23 | >>1 |
| pp + Ethylene Copolymer + nylon 6(15%) + anionic modifier (1.0%) | 59 | 41 | >>1 |
| pp + Ethylene Copolymer + nylon 6(6%) + anionic modifier (1.0%) | 50 | 31 | >>1 |

Based on the data summarized above, it may be concluded that it is possible to achieve the wetting of polypropylene by incorporating both the modification through grafting technique utilizing either EMA or an acrylic acid or maleic anhydride, and hydrophilic modifier, such as ethoxylated alkyl materials. Either of these by itself will not impart the wettability. This polypropylene/polar group material/hydrophilic modifier material combination may be used for various applications wherein reasonable or high wettability is desired (i.e., a contact angle of less than about 80° and spreading factor >1), such as diapers, pads, filters, tea bags, or battery separators formed of woven or nonwoven fibers. The wettability and spreadability can further be enhanced by incorporating another polyamide, i.e., either nylon 6 or 66, into the above material.

Two preferred hydrophilic modifiers are polypropylene glycol polyoxyethylates, e.g.

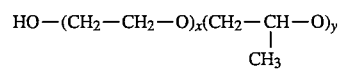

and fatty alcohol polyoxyethylates, e.g.

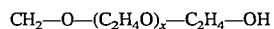

Other preferred modifiers include alkyl phenol polyoxyethylates, e.g.,

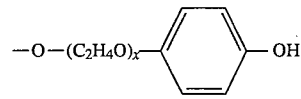

fatty acid polyoxyethylates, e.g.,

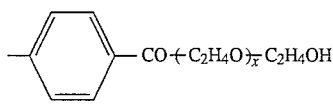

fatty acid amide polyoxyethylates, e.g.,

and polyethylene ether of alkyl phenols, e.g.,

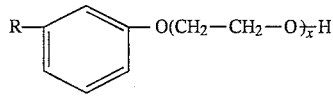

Other suitable modifiers may include polyoxyalkylated fatty amine; Na-dialkyl sulfosuccinate; polyoxyalkylene alkyl esters; polysiloxane and polyoxyethylene copolymers; N-cyclohexyl-2-pyrrolidone; N-octyl-2-pyrrolidone; diethylene glycol; acetophenone; butyl benzoate (trademark Cindye Dac-888); monochlorotoluene (trademark Lan Cara); blend of esters (Cindye Dac-999); 2-ethyl hexanol; and biphenyl.

From the above examples, it may be understood that the addition of both polar group material and the hydrophilic modifier to a polypropylene based material will result in a material which is hydrophilic and thus "wettable". The polar group material may be an EMA material as described above, or may be either an acrylic acid comprising about 0.1% to 2% by weight of the polypropylene, or a maleic anhydride comprising about 0.1% to 10%, and preferably 0.1% to 2%, by weight of the polypropylene. The hydrophilic modifier may be either a non-ionic or anionic material, and may be used in compositions wherein the hydrophilic modifier is present in the amount of between 0.1% and 2%, and preferably between 0.4% and 1.0%, of the weight of the polypropylene and polar group material.

While it is not desired to be bound by any particular theory as to why the above composition becomes so much more wettable compared to similar polypropylene-based materials, it is speculated that the combination of increased dispersive and polar functions far exceeds the surface energy that is very critical for adequate wetting to occur on polyolefin surfaces. Neither a polar material nor a hydrophilic modifier on its own is capable of imparting such highly desired characteristic that produces good spreading and even dyeing.

The above material can be comparatively easy to dye compared to some modified polypropylene materials, and may be either acid dyeable, base dyeable, or disperse dyeable.

In order to channel a fluid to a target or acquisition zone, current practice would involve the use of a surfactant-treated polypropylene nonwoven web in diaper product lines. A polypropylene nonwoven web generally has to go through an extra step to be slightly hydrophilic. This treatment unfortunately is not believed to be permanent in its nature, and tends to leak out.

The wettable polymers as described above thus have significantly improved hydrophilic characteristics which enable the polymers to be formed into fibers suitable for fabrics or into injection molded films. These polymers provide improved dyeability, and particularly make the polymer dyeable with a broad range of disperse dyes. This increased dyeability feature is of great importance because certain disperse dye molecules are to large to diffuse into the fiber core of prior art polypropylene fibers, but these same molecules may penetrate into the improved polypropylene fibers of this invention. Dye selection therefore becomes less complex, and the final shade of the dyed product is brighter, deeper and sharper than prior art compositions. This wettability characteristic also should provide excellent exhaustion for the dyed products, since the dye molecules once in place in a fiber should tend to stay in place. Improved washfastness and crockfastness results may thus be expected, and the product should be both wettable and dyeable for various applications. It is expected that various polyamid compositions would be dyeable with either acid or disperse dyes.

Figure 2:
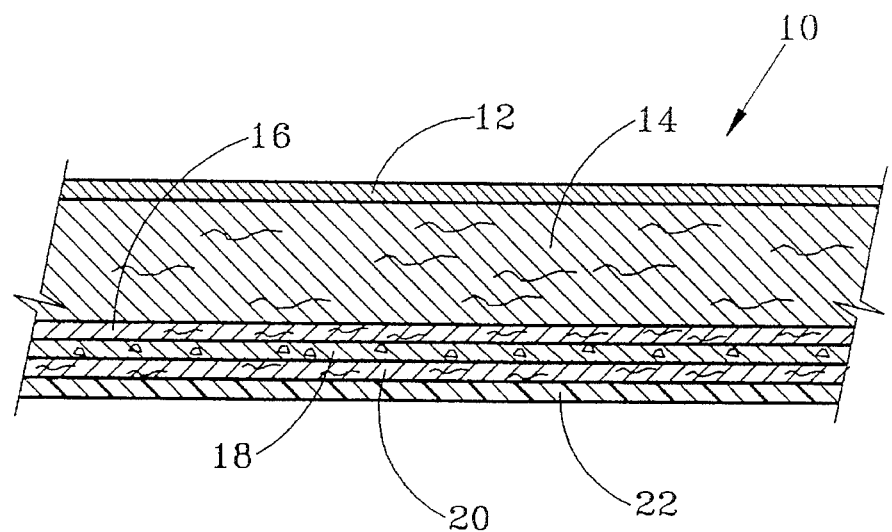
FIG. 2 illustrates in cross-section a portion of a diaper which includes nonwoven web material having a polyolefin composition according to the present invention. The diaper also includes an absorbent material core, a facing sheet, and a backing sheet.

A hydrophilic or wettable polymer provides highly desirable material features, such as permanently, wickability, and extra comfort. These attributes are highly desired in product applications such as diapers, adult incontinence products and sanitary napkins, where a nonwoven web comes in contact with the body or entry point for any fluid penetration. Referring to FIG. 2, the cross-section of a suitable diaper according to the present invention is depicted. The diaper 10 comprises a facing sheet 12, absorbent core 14, nonwoven fabric sheet 16, an absorbent sheet 18, a second nonwoven fabric sheet 20, and a backing sheet 22. The polypropylene fibers of the present invention are particularly well suited for forming the nonwoven fabric sheets 16 and 20, and may also be used for forming the facing sheet 12. Further details with respect to construction of a suitable diaper are disclosed in U.S. Pat. No. 4,540,414.

The utility of this composition is not limited to absorbent products as described above, and the invention has utility also in packaging and consumer goods. Tea bag pouches formed from a nonwoven web may thus be made of this polypropylene material. By having a wettable polypropylene nonwoven web, an increased immersion of tea leaves in hot or cold water is expected to result in a final product with improved aroma, taste and efficiency. Moreover, the improved nonwoven web will not produce any significant detrimental effect, such as leaching out a component which may affect taste.

Figure 3:
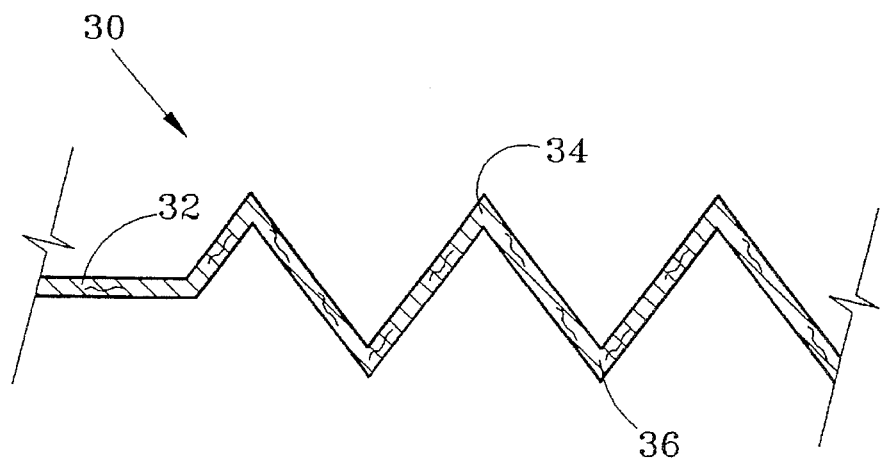
FIG. 3 illustrates a cross-sectional view of a web material for forming a filter including a polyolefin composition according to the present invention.

In industrial products, nonwoven mats made out of polypropylene are increasingly used. The present invention is accordingly expected to significantly enhance the performance of mats or fabric sheets containing nonwoven fibers. For example, filter cartridges made out of polypropylene will have tremendous affects on pressure drop, since the initial resistance will be reduced and internal wicking will promote a high flow rate. The life time of the filter will be increased while also increasing the flow rate characteristics of the filter. From a commercialization standpoint, the "durability" feature could have numerous application in both absorbent products and non-absorbent products. Referring to FIG. 3, the cross-section of a suitable filter sheet for filtering particulate from the gas steam is disclosed. Filter 30 as shown in FIG. 3 may conclude substantially planar mat 32 having polypropylene fibers as disclosed herein. Those skilled in the art will further appreciate that the mat may be formed to have a plurality of generally V-shaped bends 34 and 36 commonly used in filters for increasing the cross-sectional flow area through the filter medium while decreasing the overall size of the filter.

In addition to being used as a diaper cover stock or a filtration media, the fabric sheet including nonwoven fibers according to the present invention may be used as a carpet component, and wipes and roll towels, coated or laminated fabrics embedding another home furnishing fabrics, and surgical caps and gowns, and durable papers and packaging, and in interlinings and interfacings. Information regarding manufacture of nonwoven fabrics, the performance of these materials, and the market for nonwoven fabrics is disclosed in a brochure entitled "Guide To Nonwoven Fabrics" by Association of the Copple Kettle in Nonwoven Fabrics Industry.

While the techniques of the present invention are particularly well suited for increasing the wettability characteristics of polyproylene, it should be understood that the selected polar group material, such as an ethylene copolymer including alkyl acrylate as described above, in combination with a hydrophilic modifier as described above, may be used to substantially increase the wettability characteristics of other polyolefin materials, such as polyester, nylon, and acetate, all of which may be used to form fibers. Those skilled in the art will also appreciate that fibers made of a polyolefin material as disclosed herein may be used for various woven or nonwoven applications to form either fabrics or mats. The fibers may also be combined with other common stock materials, such as pulp or paper stock, to form a desired wettable and breathable fabric or mat. As previously explained, the concept of the present invention may also be used for form materials such as fibrillated films which did not include fibers.

Various modifications to the modified polypropylene fibers and to the techniques described herein for forming and dyeing such fibers should be apparent from the above description of those preferred embodiments. Although the invention has thus been described in detail for these embodiments, it should be understood that this explanation is for illustration and that the invention is not limited to these embodiments. Alternative fibers and forming and dyeing techniques will thus be apparent to those skilled in the art in view of this disclosure, and such alternative fibers and techniques may be performed without departing from the spirit of the invention, which is defined by the claims.

What is claimed is:

1. A polyolefin composition, comprising:
   (a) about 98 to 70% by weight of a polyolefin;
   (b) a selected amount of a polar group material, the polar group material being an ethylene copolymer comprising 70 to 82% and about 30 to 18% by weight of an alkyl acrylate wherein the alkyl acrylate has one to four carbon atoms, said alkyl acrylate being present in an amount between 0.2%–3.0% by weight of the sum of the polyolefin and ethylene copolymer, wherein at least a portion of said copolymer is grafted onto said polyolefin; and
   (c) a hydrophilic modifier in an amount by weight of from 0.1% to 2.0% of the polyolefin.

2. The composition of claim 1 in which the ethylene copolymer is ethylene methyl acrylate.

3. The composition of claim 1 in which the ethylene copolymer is ethylene ethyl acrylate.

4. The composition of claim 1 in which the ethylene copolymer is ethylene butyl acrylate.

5. The composition of claim 1 in which the alkyl acrylate is present in an amount of 0.5 to 2.0% by weight of the sum of the polyolefin and ethylene copolymer.

6. The composition of claim 1 wherein the ethylene copolymer is present in an amount between 2 to 15% by weight.

7. The composition of claim 1, wherein the hydrophilic modifier is selected from a group consisting of polypropylene glycol polyoxyethylates, fatty alcohol polyoxyethylates, akyl phenol polyoxyethylates, fatty acid polyoxyethylates, fatty acid amide polyoxyethylates, and polyethylene esters of alkyl phenols.

8. The composition of claim 1 wherein the composition further includes a polyamide blended therein in an amount by weight of from 1% to 20% of the polyolefin.

9. A polypropylene based fiber, comprising:
   about 98 to 70% by weight of a polypropylene, a selected amount of a polar group material, the polar group material being an ethylene copolymer incorporated into the polypropylene to form an alloy, said ethylene copolymer comprising about 70 to 82% by weight ethylene and about 30 to 16% by weight of an alkyl acrylate wherein the alkyl acrylate has one to four carbon atoms, said alkyl acrylate component present in an amount between 0.2–3.0% by weight the sum of the polypropylene and ethylene copolymer, and a hydrophilic modifier in an amount by weight of from 0.1% to 2% of the polypropylene.

10. The fiber of claim 9 in which the ethylene copolymer is ethylene methyl acrylate.

11. The fiber of claim 9 wherein the ethylene copolymer is present in an amount between 2 to 15% by weight.

12. The fiber of claim 9, wherein the hydrophilic modifier is selected from a polar group consisting of polypropylene glycol polyoxyethylates and fatty alcohol polyoxyethylates.

13. The fiber of claim 9 wherein the composition further includes a polyamide blended therein in an amount by weight of from 1% to 20% of the polypropylene.

14. A process for forming a wettable polyolefin composition, comprising:
   forming a composition of about 98 to 70% by weight of a polyolefin, a selected amount of a polar group material and a hydrophilic modifier in an amount by weight of about 0.1% to 2% the sum of the polyolefin and polar group material, the polar group material being an ethylene copolymer, the ethylene copolymer comprising about 70 to 82% by weight ethylene and about 30 to 18% by weight of an alkyl acrylate wherein the alkyl has one to four carbon atoms, said alkyl acrylate present in the composition in an amount between 0.2 to 3.0% by weight of the sum of the polyolefin and ethylene copolymer.

15. The process of claim 14 wherein the alkyl acrylate is present in an amount between 0.5%–2.0% by weight.

16. The process of claim 14 wherein the hydrophilic modifier is present in an amount by weight of about 0.4% to 2.0% the sum of the polyolefin and ethylene copolymer.

17. The process of claim 14 wherein the polyolefin is polypropylene, and at least a portion of the ethylene copolymer is grafted onto the polypropylene.

18. The process of claim 14 in which the ethylene copolymer is ethylene methyl acrylate.

19. The process of claim 14 in which the ethylene copolymer is ethylene ethyl acrylate.

20. The process of claim 14 in which the ethylene copolymer is ethylene butyl acrylate.

21. The process of claim 14 wherein the ethylene copolymer is present in an amount between 2 to 15% by weight.

22. The process of claim 14 wherein the polyolefin is polypropylene and the composition further includes a polyamide blended therein in an amount by weight of from 1% to 20% of the polypropylene.

23. A process for forming a polypropylene fiber, comprising:
   (a) combining polypropylene with a selected amount of a polar group material, the polar group material being an ethylene copolymer, the ethylene copolymer comprising about 70 to 82% by weight ethylene and about 30 to 18% by weight of an ethylene alkyl acrylate wherein the alkyl group has one to four carbon atoms, said alkyl acrylate comprising less than 3.0% by weight of the sum of the polypropylene and ethylene copolymer, and a selected amount of a hydrophilic modifier sufficient to result in a wetting contact angle of less than about 80°; and (b) forming the composition into fibers.

24. The process of claim 23 wherein at least a portion of the ethylene copolymer is grafted onto said polypropylene.

25. The process of claim 23 wherein ethylene alkyl acrylate copolymer is ethylene methyl acrylate.

26. The process of claim 23 wherein the hydrophilic modifier is present in an amount by weight of about 0.4% to 2.0% of the polypropylene.

27. The process of claim 23 wherein the ethylene copolymer is present in an amount between 2 to 15% by weight.

28. The process of claim 22, wherein the hydrophilic modifier is selected from a group consisting of polypropylene glycol polyoxyethylates and fatty alcohol polyoxyethylates.

29. The process of claim 22 wherein the composition further includes a polyamide blended therein in an amount by weight of from 1% to 20% of the polypropylene.

30. A fabric sheet including nonwoven fibers, comprising:

(a) about 98 to 70% by weight of a polyolefin;

(b) a selected amount of a polar group material, the polar group material being an ethylene copolymer comprising 70 to 82% and about 30 to 18% by weight of an alkyl acrylate wherein the alkyl acrylate has one to four carbon atoms, said alkyl acrylate being present in an amount between 0.2%–3.0% by weight of the sum of the polyolefin and ethylene copolymer, wherein at least a portion of said copolymer is grafted onto said polyolefin; and (c) a hydrophilic modifier in an amount by weight of from 0.1% to 2.0% of the polyolefin.

31. The fabric sheet of claim 30 in which the ethylene copolymer is ethylene methyl acrylate.

32. The fabric sheet of claim 30, wherein the fabric sheet includes a pulp stock.

33. The fabric sheet of claim 30, wherein the sheet forms a diaper stock layer.

34. The fabric sheet of claim 30, wherein the sheet forms a filter medium.

* * * * *